US008707333B1

(12) United States Patent
Pohorsky et al.

(10) Patent No.: US 8,707,333 B1
(45) Date of Patent: Apr. 22, 2014

(54) MESSAGE ARGUMENT DESCRIPTORS

(75) Inventors: Tom Pohorsky, Santa Cruz, CA (US);
Bala Vijayakumar, San Jose, CA (US);
Scott Lee, Bellevue, WA (US);
Srinivasan Ramachandran, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 1301 days.

(21) Appl. No.: 11/811,363

(22) Filed: Jun. 8, 2007

(51) Int. Cl.
*G06F 3/00* (2006.01)
*G06F 7/04* (2006.01)
*G06F 15/16* (2006.01)

(52) U.S. Cl.
USPC ............... 719/316; 719/313; 726/26; 726/27; 709/229

(58) Field of Classification Search
CPC . H04L 63/0428; H04L 63/0823; H04L 65/80; H04L 63/12; H04L 63/08; H04L 69/329; H04L 67/34; H04L 67/36; H04L 29/12009; H04L 29/12433; H04L 61/2539; H04W 12/06; H04W 12/08; H04W 12/12
See application file for complete search history.

(56) References Cited

U.S. PATENT DOCUMENTS

| | | | |
|---|---|---|---|
| 6,199,070 B1 | 3/2001 | Polo-Wood et al. | |
| 2002/0046240 A1* | 4/2002 | Graham et al. | 709/203 |
| 2004/0139204 A1* | 7/2004 | Ergezinger et al. | 709/229 |
| 2004/0220945 A1 | 11/2004 | Pioli et al. | |
| 2005/0137845 A1 | 6/2005 | Carrol et al. | |
| 2005/0138207 A1 | 6/2005 | Chen et al. | |
| 2005/0267738 A1 | 12/2005 | Wilkinson et al. | |
| 2006/0047499 A1 | 3/2006 | Chen et al. | |
| 2006/0095774 A1* | 5/2006 | Butterfield et al. | 713/176 |
| 2006/0190493 A1* | 8/2006 | Kawai et al. | 707/104.1 |
| 2007/0106998 A1* | 5/2007 | Zeldin et al. | 719/313 |
| 2007/0244976 A1* | 10/2007 | Carroll et al. | 709/206 |
| 2007/0299925 A1* | 12/2007 | Kirkland | 709/206 |
| 2008/0222735 A1* | 9/2008 | Cohen et al. | 726/27 |
| 2008/0222736 A1* | 9/2008 | Boodaei et al. | 726/27 |

OTHER PUBLICATIONS

"Preventing Piracy, Reverse Engineering, and Tampering", Gleb Naumovich, 2003, pp. 1-8.*
Matsubara et al., "A Practical Guide for Resource Monitoring and Control (RMC)", Aug. 2002, pp. 1-220 [retrieved from http://www.redbooks.ibm.com/pubs/pdfs/redbooks/sg246615.pdf].
J. Hutchins, "Machine Translation: History", Encyclopedia of Language Linguistics, 2nd Edition, vol. 7, pp. 375-383, 2006.
Farghaly et al., "Arabic Natural Language Processing: Challenges and Solutions", ACM Transactions on Asian Language Information Processing, vol. 8, No. 4, Article 14, Dec. 2009.
Marasco et al., "Software Development Productivity and Project Success Rates: Are We Attacking the Right Problem?", Feb. 15, 2006.
A. Kelly, "C by Dissection", Addison-Wesley Publishing Co., pp. 3-12, 361-378, 1996.

(Continued)

*Primary Examiner* — Tuan Dao
(74) *Attorney, Agent, or Firm* — Van Pelt, Yi & James LLP

(57) ABSTRACT

Specifying a message is disclosed. A message and one or more arguments of the message are specified. An argument type is associating with at least one of the one or more arguments. Processing a message is disclosed. A message is identified to be transformed. The message is transformed at least in part by using an argument type associated with an argument of the message.

30 Claims, 4 Drawing Sheets

(56) References Cited

OTHER PUBLICATIONS

IEEE 100, The Authoritative Dictionary on IEEE Standard Terms, 7th Ed., pp. 606, 649, 721, 2000.

W.R. Stevens, "UNIX Network Programming", vol. 1, 2nd Ed., 1998, pp. xv-xvii.
W.R. Stevens, "UNIX Network Programming", vol. 2, 2nd Ed., 1998, pp. 3-4.
Pohorsky et al., U.S. Appl. No. 11/811,274, filed Jun. 8, 2007.

* cited by examiner

MESSAGE ARGUMENT DESCRIPTORS

BACKGROUND OF THE INVENTION

A message (e.g., status message, error message, log entry, text data for display to a user, etc.) is often specified by a programmer in program code. Specifying the text message typically includes specifying one or more arguments of the message that can be used to dynamic determine at least a portion of the message during runtime of the program. For example, a program variable is specified as an argument of the message, and the content of the variable is included in a generated output of the message such as a log file or output text to be displayed to a user. Processing can be performed using the specification of the message in program code and/or the generated message output. Often the processing requires information about arguments of the message. However, the generated message output does not typically include data about the arguments of the message. For the specification of the message in program code, although the programming language of the program code can be used to specify a data type (e.g., integer, float, string, etc.) associated with the message argument, often the processing performed using the program code message specification requires information about message arguments that cannot be determined from the associated data type information. Therefore there is a need for a way to determine additional information about an argument of a program code message.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Associating an argument type with an argument of a message is disclosed. In some embodiments, the message includes text specified in program code for output. When the message of the program code is outputted, the message output includes contents of one or more arguments of the message at the time the message was outputted, and the argument contents are associated with one or more corresponding argument types. Using the associated arguments types, the message specification and/or the message output can be modified, searched, transformed, categorized, and/or otherwise processed. For example, in rendering the message for a viewer that is not authorized to view private contents of the message, contents of message arguments associated with an argument type that indicates the associated content as private are obfuscated before the message is rendered for display.

Figure 1:
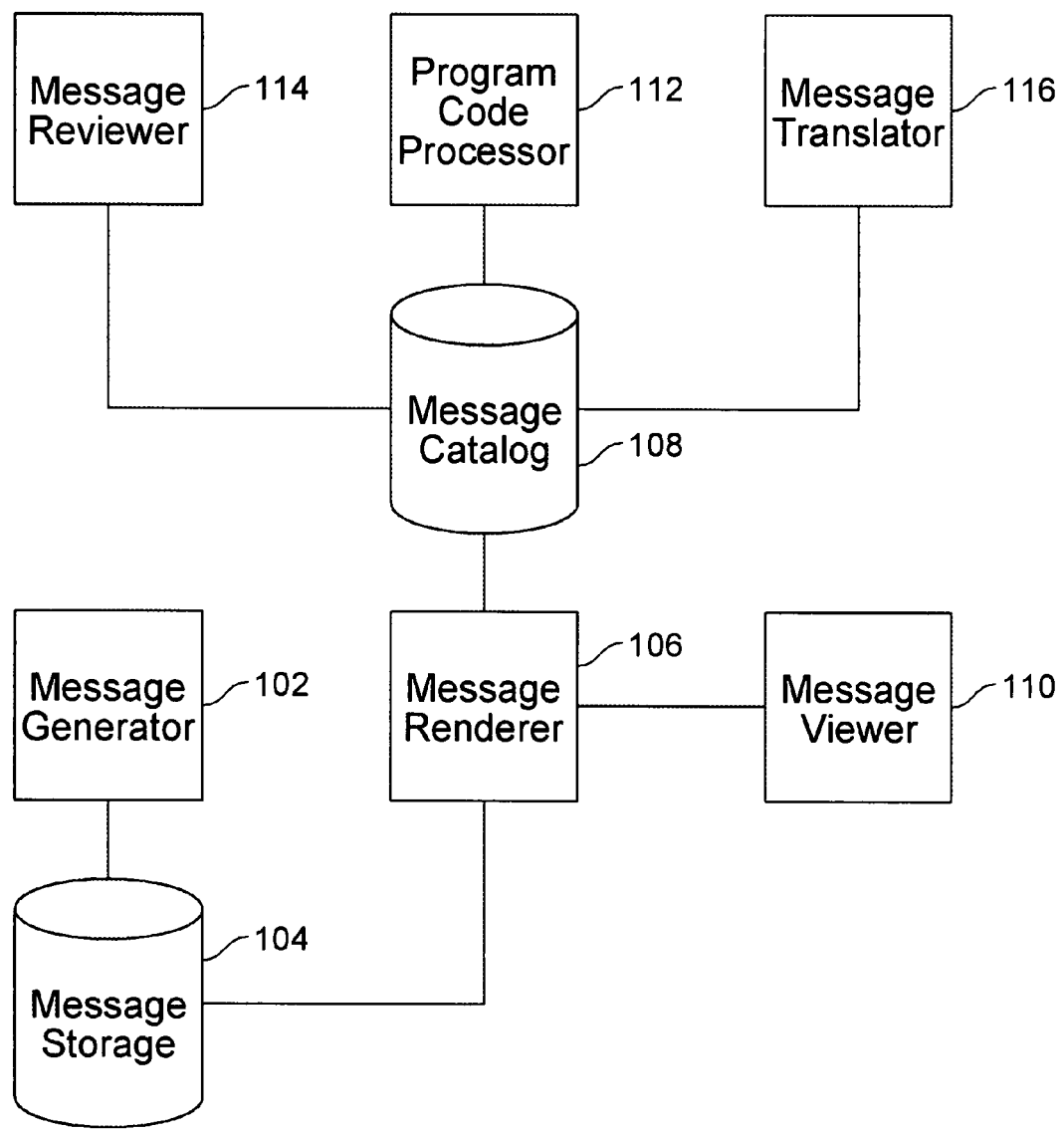
FIG. 1 is a block diagram illustrating an embodiment of a program code message environment.

FIG. 1 is a block diagram illustrating an embodiment of a program code message environment. Message generator 102 generates a message output. In some embodiments, message generator 102 executes at least a portion of program code that includes a specification of a message to be generated. For example, using a syntax of a programming language, a programmer specifies the message for output when a program/process of the program code is executed. The message output generated by generator 102 is stored in message storage 104. For example, the message output is stored in a log file in storage 104. In some embodiments, the message output is stored in storage 104 not as an end destination but as a temporary destination before the generated message output is used to render the message in a desired format. For example, an error message to be displayed to a user is temporarily stored in message storage 104 before being sent to be rendered for a viewer in a desired language. In some embodiments, the message output includes contents of one or more message arguments at the time the message output was generated. For example, contents of one or more variables used as message arguments are stored in the message output. The message argument contents stored in the message output are not substituted in a message form of the message until the message is rendered.

Message renderer 106 renders a message output stored in message storage 104. In some embodiments, message renderer 106 renders the message output in response to a request for the message output to be viewed. Rendering the message includes displaying the message in a determined context. Message catalog 108 includes data that can be used to render a message. In some embodiments, foreign language translations of a message are stored in message catalog 108. A plurality of message catalogs may be used. In the example shown, message catalog 108 is used at least in part to render the message. Message catalog 108 is optional. Message viewer 110 is to view the rendered message. Examples of message viewer 110 include a log viewer, a message dialog, and any other interface that can be used to view a rendered message.

Program code processor 112 processes program code to identify and manage messages defined in the program code. For example, one or more messages specified in program code are identified and added to message catalog 108 by processor 112. Message reviewer 114 reviews messages stored in message catalog 108. For example, the messages are reviewed for grammar, spelling, readability, correctness, and/or compliance. Message translator 116 translates one or more messages stored in catalog 108. The translated messages may be stored in catalog 108, another message catalog, and/or in another destination. In various embodiments, program code processor 112, message reviewer 114, and/or message translator 116 are optional.

Processing can be performed using the specification of the message in program code and/or the message output. Since the message includes one or more arguments that are determined at runtime, uncertainty about the function and/or semantic role of message arguments makes some desired processing difficult. For example, the ability to recognize the meaning of certain parts of a text is useful during language translation where different semantic meaning of a word can result in different translation of the same text in the same language. If semantic meaning can be provided about message arguments to be substituted in the message text, the translation of the message can be improved.

Figure 2:
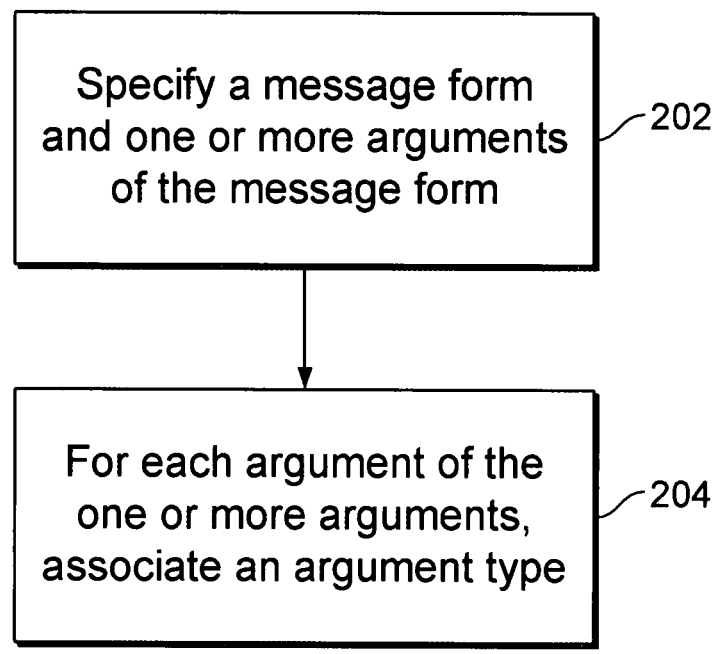
FIG. 2 is a flowchart illustrating an embodiment of a process for associating an argument type with a message form.

FIG. 2 is a flowchart illustrating an embodiment of a process for associating an argument type with a message form. At 202, a message form and one or more arguments, if any, of the message are specified. Specifying the message form and arguments is included in specifying a message in program code. An example of the program code includes code generated using a function-oriented programming language such as the C programming language. The message form defines the content and/or structure of the message. For example, the message form defines the text to be rendered along with contents of one or more message argument variables, if any. The one or more arguments of the message form allow contents of the arguments to be inserted into an output generated using the message form. For example, to display "Hello" with a name of a person dynamically obtained from a program code variable, the following C programming language statement can be used: printf("Hello % s", name). "Hello % s" is the message form and "name" is the argument of the message. When the printf statement is executed, contents of the "name" variable is substituted for the "% s" in the message form.

At 204, an argument type is associated with at least one argument of the one or more arguments. In some embodiments, more than one argument type is or may be associated with a single argument. In some embodiments, associating the argument type includes specifying in program code an argument type identifier for each of the one or more arguments. In some embodiments, the argument of the message is associated with a programming language data type identifier in addition to the argument type identifier. For example, a variable specified as an argument of the message is associated with the data type identifier when the variable is instantiated in program code. In some embodiments, the argument type identifier identifies one of a plurality of predetermined argument types. For example, in a function-oriented programming language such as the C programming language, message argument type identifiers are specified in some embodiments by "#define" as shown below.

define AD_NONE 0 /* no description */
    #define AD_MINNUM 1 /* use 1 to 9 for numbers */
    #define AD_NUMx 1 /* integer */
    #define AD_NUMl 2 /* long integer */
    #define AD_NUMf 3 /* double float */
    #define AD_NUMu 5 /* unsigned */
    #define AD_MAXNUM 9 /* use 1 to 9 for numbers */
    #define AD_LIT 10 /* text literal */
    #define AD_MLIT 11 /* text literal preceded with Msg ID */
    #define AD_MIN_OBFUS 12 /* start of main obfuscation AD set */
    #define AD_HOST 12 /* hostname */
    #define AD_USER 13 /* username */
    #define AD_NETADDR 14 /* network address, e.g. TCP/IP address */
    #define AD_MAX_OBFUS 19 /* end of main obfuscation AD set */
    #define AD_PROG 20 /* program name */
    #define AD_DEV 21 /* device name */
    #define AD_VOL 22 /* volume name */
    #define AD_PATH 23 /* path name */
    #define AD_ERROR 24 /* error strings */
    #define AD_TYPE 25 /* RAP Attribute Types */
    #define AD_GROUP 26 /* group name */
    #define AD_POOL 27 /* pool name */
    #define AD_PRIV 28 /* privilege type */
    #define AD_TIMESEC 30 /* display time, seconds since 1970 */
    #define AD_TIMEMIL 31 /* time, milliseconds since 1970 */
    #define AD_TIMENAN 32 /* time, nanoseconds since 1970 */
    #define AD_TIMET 33 /* time, time_t */
    #define AD_TIMET64 34 /* time, lg_time64_t */
    #define AD_TIMESTR 35 /* time, text string */
    #define AD_TIMEUNK 36 /* time, unknown format */
    #define AD_OP 40 /* operation, e.g. backup, rewind, delete */
    #define AD_STATUS41 /* adjective like successful, incomplete */
    #define AD_NOUN 42 /* noun */
    #define ADVERB 43 /* verb */
    #define AD_PROD_DATA 44 /* product data */
    #define AD_ARCHREQNAME 45 /* Archive Request Name */
    #define AD_SLOTRANGE 46 /* Slot range */
    #define AD_SLOT 47 /* Slot */
    #define AD_LABEL 48 /* Label */
    #define AD_STBUF 49 /* Structured text stored as char buffer */

In the example above, a message argument associated with the "AD_STBUF" argument type identifier includes a complete message. This allows a message to be recursively nested as an argument in another message. In some embodiments, a data structure such as a struct of the C programming language associates the message arguments with the message argument type identifier. A message argument identifier may be assigned manually and/or automatically. For example, a programmer identifies specifies the argument type identifier when specifying the message in program code. In another example, the message argument type for a message argument is determined automatically at least in part by examining the content of the message argument.

Figure 3:
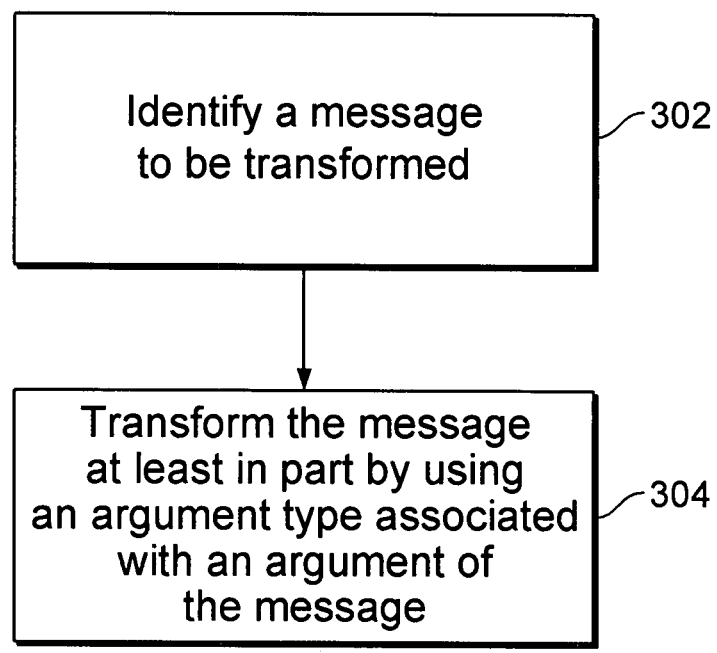
FIG. 3 is flowchart illustrating an embodiment of a process for processing a message.

FIG. 3 is flowchart illustrating an embodiment of a process for processing a message. At 302, a message to be processed is identified. In some embodiments, identifying the message includes identifying message data in program code and/or in a message catalog such as catalog 108 of FIG. 1. For example, the message to be processed is identified at least in part by using an identifier of the message. The message identifier can be used to obtain from a message catalog data associated with the message. In some embodiments, identifying the message includes identifying a message output. In some embodiments, the message output includes contents of one or more message arguments at the time the message output was generated. A respective message argument identifier and message argument type identifier are associated with each included message argument content.

At 304, the message is processed at least in part by using an argument type associated with an argument of the message. In some embodiments, processing the message includes performing one or more of the following: translating at least a portion of the message using an argument type, searching at least a portion of the message using an argument type, and transforming at least a portion of the message using an argument type.

For example, when translating a message form of the message to another language, it is difficult to determine what type of data will be substituted in as the message argument. If no additional information about the message argument is available, the translation of the message form may not be grammatically correct. The message argument type can provide additional semantic information about the message argument to create a better translation of the message form. As an example, in the C programming language, if the message form to translate is "% s: % s % s % s", a foreign language translator has no idea on what semantic role (i.e. noun, verb, adjective, etc) each % s represents without an associated message argument type identifier. Depending on the role, the order of the % s may be different for different languages. For each % s message argument, there exists an associated message argument type identifier (e.g. identifiers that that identify the first and second % s are nouns, the third % s is a verb, and the last % s is an status). The translator can make informed per-language adjustments to the translated message form using the message argument type information.

In another example, the message is outputted in a log. The log may contain large amount of other messages, and a viewer may desire to filter the log to only view messages of interest. By using message argument type identifier associated with the messages in the output, context-specific search is possible. A text search only within message argument contents associated with a specified argument type can be performed. For example, instead of finding all instances of "Server2," a user can search for instances of "Server2" only when used as a device host (e.g., associated with device host message argument type) or only when used as a data source (e.g., associated with data source message argument type).

In another example, the message argument type identifier is used to validate the message during source coding and runtime. The message can be checked to determine whether the message follows a required pattern of one or more message argument types and/or includes a not allowed pattern of one or more message argument types.

Figure 4:
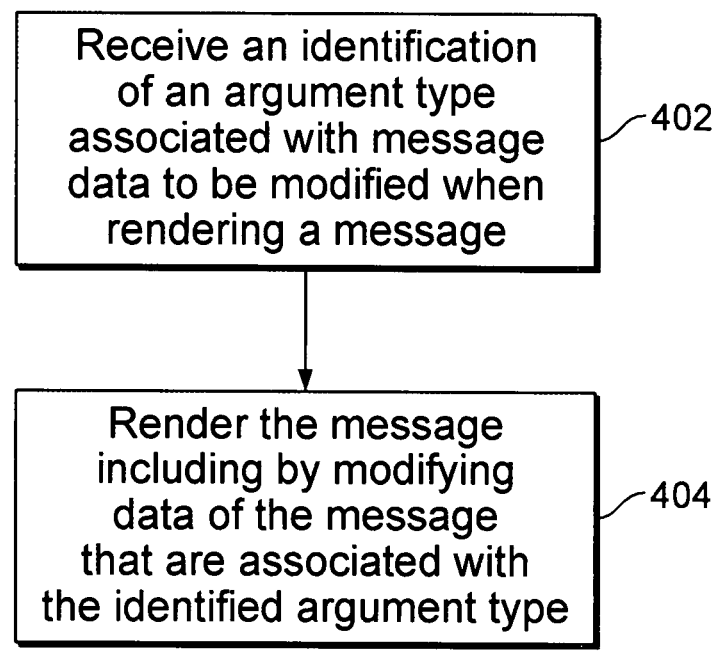
FIG. 4 is a flowchart illustrating an embodiment of a process for rendering a message.

FIG. 4 is a flowchart illustrating an embodiment of a process for rendering a message. In some embodiments, the process of FIG. 4 is included 304 of FIG. 3. At 402, an identification of an argument type associated with message data to be modified when rendering a message is received. In some embodiments, the message data includes message argument content included in a message output of a message specified in program code. At 404, the message is rendered including by modifying the message data that are associated with the identified argument type. Rendering the message includes displaying at least a portion of the message to a viewer. In various embodiments, modifying the message data includes translating, obfuscating, replacing, adding, and/or removing content of the message data.

For example, if contents of specific message arguments are desired to be hidden to a non-secure third party, sensitive data such as host name and network address (e.g., content associated with host name argument type and network address argument type) can be scrambled or aliased so that it is obfuscated when rendered for display. In another example, when the message argument content is a time value, different locales may wish to view the time value in different formats. One locale may desire to view the time in a MM/DD/YY format, whereas another locale may wish to view the time in a DD/MM/YY format. By using an argument type to determine that a message argument content is associated with a time value, the content can be translated into a desired time format of the viewer.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing a message, comprising:
identifying a message to be transformed;
using a processor to transform the message at least in part by using an obfuscation argument type, wherein:
the obfuscation argument type is associated with a network entity identifier argument;
the network entity identifier argument is associated with identifying an entity in a network and is used to dynamically determine message data at runtime; and
transforming includes:
receiving identification of one or more argument types associated with message data to be obfuscated, wherein the identified argument types include the obfuscation argument type; and
in response to receiving the obfuscation argument type as one of the argument types associated with message data to be obfuscated, transforming the message into a partially obfuscated message where the network entity identifier argument is replaced with an obfuscated network entity identifier from which the network entity identifier argument being replaced cannot be determined; and
displaying the partially obfuscated message, wherein the obfuscated network entity identifier is displayed in place of the network entity identifier argument.

2. A method as recited in claim 1, wherein identifying the message to be transformed includes using an identifier of the message to obtain message data associated with the message.

3. A method as recited in claim 2, wherein the message data is included in a messages catalog.

4. A method as recited in claim 1, wherein identifying the message includes identifying an output generated using the message.

5. A method as recited in claim 4, wherein the message output includes content of the argument at the time the message output was generated and includes an identifier of the argument type associated the content of the argument.

6. A method as recited in claim 1, wherein transforming the message includes using a received identifier of the argument type to identify the argument as an argument to be modified.

7. A method as recited in claim 1, wherein:
the obfuscation argument type is a first obfuscation argument type, the network entity identifier argument is a first network entity identifier argument, and the obfuscated network entity identifier is a first obfuscated network entity identifier;
the identified argument types include a second obfuscation argument type that is associated with a second network entity identifier argument; and
transforming the message into the partially obfuscated message includes transforming the message into the partially obfuscated message where the first network entity identifier argument is replaced with the first obfuscated network entity identifier and the second network entity identifier argument is replaced with a second obfuscated network entity identifier.

8. A method as recited in claim 7, wherein the first network entity identifier argument is associated with a hostname and the second network entity identifier argument is associated with a username.

9. A method as recited in claim 7, wherein the first network entity identifier argument is associated with a hostname and the second network entity identifier argument is associated with a network address.

10. A method as recited in claim 7, wherein the first network entity identifier argument is associated with a username and the second network entity identifier argument is associated with a network address.

11. A system for processing a message, comprising:
a processor configured to:
identify a message to be transformed;
transform the message at least in part by using an obfuscation argument type, wherein:
the obfuscation argument type is associated with a network entity identifier argument;
the network entity identifier argument is associated with identifying an entity in a network and is used to dynamically determine message data at runtime; and
transforming includes:
receiving identification of one or more argument types associated with message data to be obfuscated, wherein the identified argument types include the obfuscation argument type; and
in response to receiving the obfuscation argument type as one of the argument types associated with message data to be obfuscated, transforming the message into a partially obfuscated message where the network entity identifier argument is replaced with an obfuscated network entity identifier from which the network entity identifier argument being replaced cannot be determined; and
display the partially obfuscated message, wherein the obfuscated network entity identifier is displayed in place of the network entity identifier argument; and
a memory coupled with the processor, wherein the memory is configured to provide the processor with instructions.

12. A system as recited in claim 11, wherein identifying the message to be transformed includes using an identifier of the message to obtain message data associated with the message.

13. A system as recited in claim 12, wherein the message data is included in a messages catalog.

14. A system as recited in claim 11, wherein identifying the message includes identifying an output generated using the message.

15. A system as recited in claim 14, wherein the message output includes content of the argument at the time the message output was generated and includes an identifier of the argument type associated the content of the argument.

16. A system as recited in claim 11, wherein transforming the message includes using a received identifier of the argument type to identify the argument as an argument to be modified.

17. A system as recited in claim 11, wherein:
the obfuscation argument type is a first obfuscation argument type, the network entity identifier argument is a first network entity identifier argument, and the obfuscated network entity identifier is a first obfuscated network entity identifier;
the identified argument types include a second obfuscation argument type that is associated with a second network entity identifier argument; and
transforming the message into the partially obfuscated message includes transforming the message into the partially obfuscated message where the first network entity identifier argument is replaced with the first obfuscated network entity identifier and the second network entity identifier argument is replaced with a second obfuscated network entity identifier.

18. A system as recited in claim 17, wherein the first network entity identifier argument is associated with a hostname and the second network entity identifier argument is associated with a username.

19. A system as recited in claim 17, wherein the first network entity identifier argument is associated with a hostname and the second network entity identifier argument is associated with a network address.

20. A system as recited in claim 17, wherein the first network entity identifier argument is associated with a username and the second network entity identifier argument is associated with a network address.

21. A computer program product for processing a message, the computer program product being embodied in a tangible, non-transitory computer readable storage medium and comprising computer instructions for:
identifying a message to be transformed;
transforming the message at least in part by using an obfuscation argument type, wherein:
the obfuscation argument type is associated with a network entity identifier argument;
the network entity identifier argument is associated with identifying an entity in a network and is used to dynamically determine message data at runtime; and
transforming includes:
receiving identification of one or more argument types associated with message data to be obfuscated, wherein the identified argument types include the obfuscation argument type; and
in response to receiving the obfuscation argument type as one of the argument types associated with message data to be obfuscated, transforming the message into a partially obfuscated message where the network entity identifier argument is replaced with an obfuscated network entity identifier from which the network entity identifier argument being replaced cannot be determined; and
displaying the partially obfuscated message to a user, wherein the obfuscated network entity identifier is displayed in place of the network entity identifier argument.

22. A computer program product as recited in claim 21, wherein identifying the message to be transformed includes using an identifier of the message to obtain message data associated with the message.

23. A computer program product as recited in claim 22, wherein the message data is included in a messages catalog.

24. A computer program product as recited in claim 21, wherein identifying the message includes identifying an output generated using the message.

25. A computer program product as recited in claim 24, wherein the message output includes content of the argument at the time the message output was generated and includes an identifier of the argument type associated the content of the argument.

26. A computer program product as recited in claim 21, wherein transforming the message includes using a received identifier of the argument type to identify the argument as an argument to be modified.

27. A computer program product as recited in claim 21, wherein:
- the obfuscation argument type is a first obfuscation argument type, the network entity identifier argument is a first network entity identifier argument, and the obfuscated network entity identifier is a first obfuscated network entity identifier;
- the identified argument types include a second obfuscation argument type that is associated with a second network entity identifier argument; and
- transforming the message into the partially obfuscated message includes transforming the message into the partially obfuscated message where the first network entity identifier argument is replaced with the first obfuscated network entity identifier and the second network entity identifier argument is replaced with a second obfuscated network entity identifier.

28. A computer program product as recited in claim 27, wherein the first network entity identifier argument is associated with a hostname and the second network entity identifier argument is associated with a username.

29. A computer program product as recited in claim 27, wherein the first network entity identifier argument is associated with a hostname and the second network entity identifier argument is associated with a network address.

30. A computer program product as recited in claim 27, wherein the first network entity identifier argument is associated with a username and the second network entity identifier argument is associated with a network address.

* * * * *